United States Patent [19]

Pinder

[11] Patent Number: 4,797,367

[45] Date of Patent: Jan. 10, 1989

[54] AEROBIC COMPOSTING APPARATUS

[76] Inventor: John A. Pinder, 3 Albacore Crescent, Scarborough, Ontario, Canada, M1H 2L2

[21] Appl. No.: 84,814

[22] Filed: Aug. 14, 1987

[51] Int. Cl.$^4$ .................... C12M 1/04; B01J 1/00
[52] U.S. Cl. .................... 435/313; 435/296; 422/184; 71/9
[58] Field of Search ............... 435/296, 287, 313, 818; 71/9; 422/102, 184; 98/56, 57

[56] References Cited

U.S. PATENT DOCUMENTS

| | | | |
|---|---|---|---|
| 2,903,955 | 9/1959 | Werner, Jr. | 98/56 |
| 3,044,182 | 7/1962 | Steffen | 98/56 X |
| 4,027,427 | 6/1977 | Stoller et al. | 47/1.1 |
| 4,148,619 | 4/1979 | Deutsch | 55/385 R |
| 4,665,035 | 5/1987 | Tuncec | 435/296 |
| 4,687,645 | 8/1987 | Harvey | 422/184 |

FOREIGN PATENT DOCUMENTS 1056074  6/1979  Canada.
831623  3/1960  United Kingdom ............ 98/57

Primary Examiner—Samuel Scott
Assistant Examiner—Allen J. Flanigan

[57] ABSTRACT

The invention concerns an apparatus including an air diffuser device and process useful in the domestic scale aerobic composting of organic wastes. The air diffuser has within its air admitting opening means to exclude insects, small animal pests and to also exclude waste from entering the air diffuser. Containers may be employed which have only a single opening admitting access to the contents of the container and the side walls of the container need not have apertures. The air diffuser device may be used with a variety of types of containers and particularly with plastic bags. By using containers which do not have openings to the exterior, except for the opening in which the air diffuser is located and possible small liquid drainage openings, composting may be undertaken with control of pests and flies in regions near residences and without excessive drying of the edges of the compost mass, in a way not previously known.

10 Claims, 3 Drawing Sheets

AEROBIC COMPOSTING APPARATUS

The invention concerns an improvement in a composting apparatus and process, including an air conveying device, useful in the aerobic composting of organic wastes. The invention is particularly directed to small scale composting, such as may be practiced on a domestic scale by individual persons, or families, on the premises of their dwellings or on a similar scale in public areas. No power or manual energy is required, other than that required for introducing compostable material to a container and the removal of the derived material from the container. The air conveying device of the instant invention beneficially facilitates the ingress of ambient air into, and the egress of air out of, a composting mass. The air conveying device may be considered an air diffuser and may be used with a compost containable container having side walls without apertures and having only a single access opening. The air diffuser is particularly suited for use with flexible walled containers.

The use of containers with few openings to the exterior for aerobic composting permits composting to be undertaken with control of small animal pests, insects and flies and with conventional containers suitable for individual situations. In addition, because air admitting apertures are not needed in the exterior walls of the containers, there is not excessive or disproportionate drying of the edges of the compost mass in contact with the walls of the container.

The air diffuser of the instant invention may be removed from the composting container, upon substantial completion of composting of the wastes therein placed, and the container, which may be a plastic bag, may then be used to store the compost formed therein until required. The removed air diffuser may be placed in a second container and processing of further compostable wastes conducted. This feature additionally permits reduction in the labor necessary to handle compost compared to the use of a composter in which the compost must be removed from the composter in order to further employ the entire apparatus.

Composting is a well known method of processing organic decomposable substances, so as to recover useful materials from substances otherwise not in a condition for direct reuse. It is known to take organic wastes, that is vegetable wastes and animal wastes, and permit these to partially decay under conditions in which the identity of the individual waste items is lost and which results in a humus rich material. Such a decomposed product may be beneficially used as a soil conditioner and as an aid to healthy plant growth.

Composting processes are known to involve microorganisms and to proceed in the absence of sunlight. The present invention is directed towards that group of composting processes in which the preferred microorganisms are those which use oxygen and comprise the aerobic microorganisms.

The reactions occurring in composting and the growth of microorganisms require water. However, excessive water in a mass of material will retard the utilization of air. In addition to water and oxygen, there are known ratios of carbon to nitrogen which are associated with composting processes which perform satisfactorily. For this reason it is believed that the ratio of carbon to nitrogen should preferably be near 30 to 1. Those skilled in the art will realize that many materials may be employed beneficially in certain composts, in addition to the organic waste products of vegetable and animal origin.

Upon completion of composting it is known to store the compost and preferably under conditions in which loss of material, by wind disturbance or by liquid loss, particularly by precipitation elution, is minimized. The device of the present invention, by employing a conventional container, in addition to improving the composting process in a novel way, also permits storage of the mature compost, without the need to transfer the compost to another container, so as to preserve the beneficial characteristics of the finished compost.

Devices have been described in which air has been introduced by means of human energy into compost contained in a flexible bag. Such a device is described in U.S. Pat. No. 3,934,999 to H. R. Meier, concerning a method employing a flexible bag with a plurality of perforations in the walls thereof. In the method of H. Meier, air is expelled and reintroduced by manually compressing and "fluffing" the bag, thereby forcing air out of the bag and into the bag, respectively, through those perforations sufficiently unblocked with compost to permit air to be conveyed through the perforations, during the actual time of manually manipulating the bag.

Another approach to performing composting is described in Canadian Pat. No. 1,078,206 to P. M. Whiteside in which a rotatable container containing compost is employed. By rotating compost in a partially filled container the contents may be thoroughly mixed and air simultaneously well introduced into the rotating mass. This device requires manual energy or the use of power driven devices to operate. The device of the present invention does not require manual energy or the use of power driven devices for other than filling and emptying the composter.

A device employing air conveying members to aerate a composting mass, in this case a stack of refuse/sewage, is described in Canadian Pat. No. 1,076,720 to W. Hannes. The device of W. Hannes concerns employing, in the interior of the stack, tunnel like hollow channels arranged to facilitate the distribution of ambient air and the release of gaseous products of composting. The device of Hannes involves extensive air manifolds and is directed to cases in which extensive quantities of compostable material are being processed. Also the device of Hannes is used with the compostable materials not contained within a container but exposed directly to ambient air movements.

A still further approach to permitting air to access a composting mass is described in U.S. Pat. No. 4,060,945 to C. A. Wilson concerning the use of a composting bin. In the device of C.A. Wilson, there is provided a channel located below the compost bin, cut into the substrate upon which the bin is located, and extending beyond the wall limits of the compost bin. The channel permits air exterior to the interior of the bin to interchange with air in the bin. This approach requires at least one opening in the underlying region of the compost container, of a size capable of conveying air in quantity into the compost bin. In addition, such spaces below composters are undesirable in residential areas, as animal pests using such places may constitute a hazard to humans. The present invention provides for air to enter through the upper portion of a composter and the use of the present invention does not require empty spaces to be formed in soil.

Canadian Pat. No. 1,056,074 to J. A. Pinder describes a device permitting air to access a composting mass, involving an air conveying device mounted in an opening of the composting container. This invention, of Canadian Pat. No. 1,056,074, when employed with a container with at least one access opening relies upon diffusion of air and air flow by natural convection currents to achieve aeration of the compost mass.

The present invention includes an improvement in the apparatus of Canadian Pat. No. 1,056,074. It has been found that an improved air conveying device may be constructed which has surprisingly useful features when made of corrugated material, preferably corrugated polymeric material, and that these improvements, with an associated improvement in the air admitting zone of the device, constitute as a combination a new and heretofore unknown device and method to process organic material in composting.

One problem with air diffusers in composting is the need to have sufficient size to allow air to adequately access the composting wastes and at the same time to have the diffuser of a construction which is light in weight and sturdy. Some embodiments of the instant invention are intended to be distributed by mail and it is an objective of the invention to have the device being of a light weight form which enables low cost distribution and also facilitates ease of handling.

With larger air diffusers having corresponding larger air admitting openings there may be a difficulty in excluding insects in a way which is durable and also resistant to damage, particularly of the insect excluding member, or displacement of the insect excluding member, as may be caused in the handling of the wastes when using the air diffuser. In addition, for applications in which low cost means of composting are employed, as when using a plastic bag, particularly a low cost bag of the kind used to dispose of trash, the utilitarian role of the air diffuser depends upon it also being of a nature which is cost efficient. Extruded corrugated pipe, or tube, has become available in recent years for soil drainage applications which is low in cost, durable and light weight. The corrugated pipe of the instant invention has much greater proportion of apertures and has reduced rigidity compared to soil drainage pipe of similar size. When corrugations are formed perpendicular to the lengthwise direction of the pipe they may advantageously be used to support and strengthen structures employed to exclude insects and wastes from entering the opening use to permit air to enter the air diffuser. It has been found that the combination of attributes involved in constructing and using a composting air diffuser of corrugated polymeric material form a unique and novel combination being both unexpected and useful.

SUMMARY OF THE INVENTION

The instant invention permits air to be introduced and released from a container having at least one access opening in the container, such access opening being suitable for adding substances to, or removing substances from, a container. By comparison to the prior art, no manual energy or power driven devices are required for the purpose of introducing air into the container or for releasing air or other gaseous materials therefrom. It has been found that an air conveying device made of perforated corrugated pipe, or perforated corrugated tubing, has properties which are especially advantageous in a composting environment and, furthermore, these properties are desirable with respect to packaging and distributing the assembly for consumer use. The properties which have utility in practical and useful situations involving composting include; inertness to microbial agents, inertness to water and oxygen and compressional rigidity in a radial direction at minimal weight. When such devices are constructed of organic polymeric materials the perforations may be made in a simple and facile manner. This is particularly the case if thermoplastic materials are employed and if apertures are made while the thermoplastic material is soft. Thermoplastic material removed in forming the apertures may be reprocessed, thereby contributing to having a cost efficient product and a competitive product.

The air admitting and air conveying opening of the air diffuser device, of the instant invention, which faces the exterior must be covered to allow air to be admitted and also to both control access to the compost by small animal pests, flies and insects and to prevent wastes from entering the interior of the air diffuser and thereby reducing its usefulness. A combination of two structures are employed, one having openings smaller than about one tenth of an inch in the longest dimension suitable for excluding insects and the other suitable for supporting or protecting the insect excluding structure. The specific construction of this combination of these two structures can be varied but in all instances the two structures are held within corrugation sections to assist in supporting the two structures so that they may be light in weight and also sufficiently rigid to perform their intended purposes. In one embodiment, the insect excluding structure is a woven plastic which is adhered to a rigid perforated plate, the perforations being about one square inch in area. In another embodiment, the insect excluding structure is a woven metalic screen supported by a woven grill from below. The grill being of rigid metallic wire with wires located about one quarter inch apart one from another.

DESCRIPTION OF THE DRAWING

The invention will be described, by way of example, in further detail by reference to the drawing.

Figure 1:
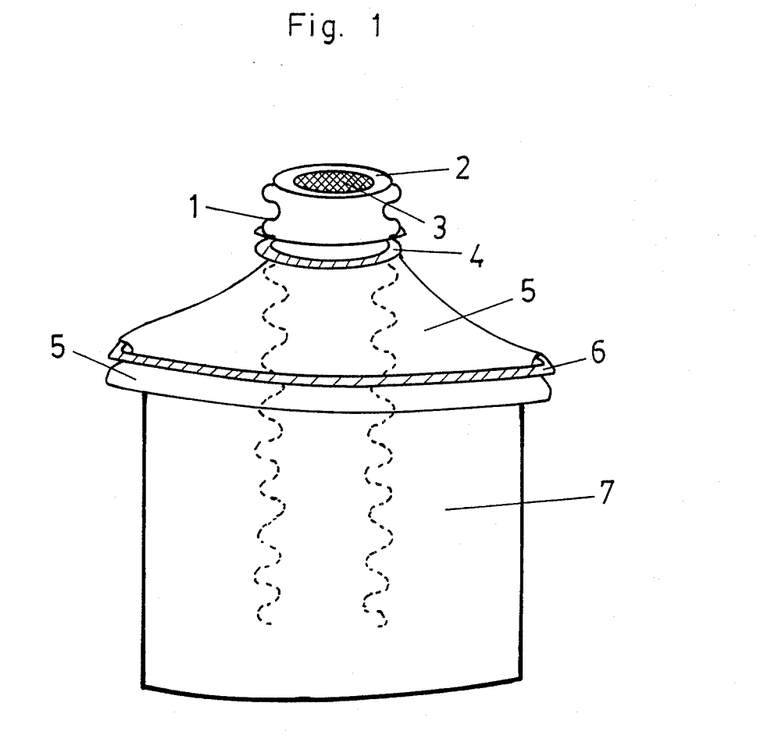
FIG. 1 is a front view in perspective of a conventioal compost containable container with one embodiment of a composting air diffuser installed therein.

In FIG. 1, 1 is a corrugated side wall of a corrugated hollow tube like structure, 2 is an upper zone of a hollow tube like structure with an air admitting opening therein, 3 is an insect excluding screen located within the air admitting opening of the upper zone of the hollow tube like structure, 4 is a cord to secure a flexible polymeric sheet material to the air diffuser, 5 is a flexible polymeric sheet material, 6 is an extendable elastic strap to secure the flexible polymeric sheet material to the compost containable container, 7 is the container. In this embodiment, the corrugated hollow tube like structure is substantially circular in cross section.

Figure 2:
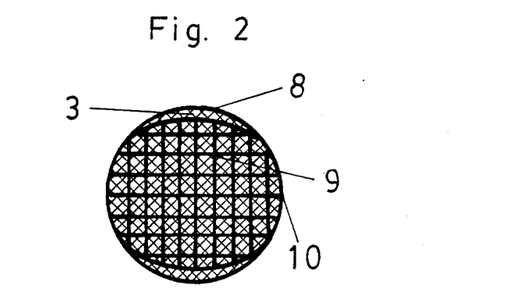
FIG. 2 is a top view of two structures, as installed in combination in the air admitting opening of the same embodiment of an air diffuser as in FIG. 1.

In FIG. 2, 3 is a fine insect excluding screen, 8 is a sealant surrounding the lateral extremities of the insect excluding screen, 9 is a grill adjoining to and located immediately below the screen 8, 10 is a sealant surrounding the lateral extremities of the grill 9. The grill is shaped non circularly to facilitate installation within the air diffuser. In this embodiment the grill 9 is substantially rigid and having at least some elements having one dimension greater than two hundredths of an inch and with the distance between adjacent elements being between one sixth inch and two inches.

Figure 3:
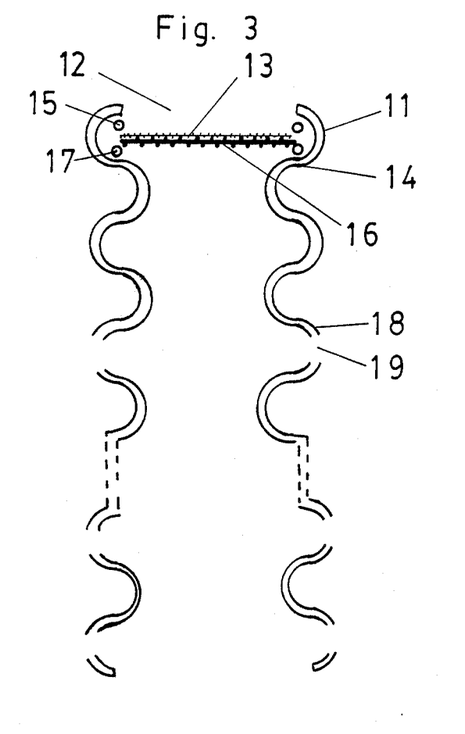
FIG. 3 is a front view in section of a lengthwise plane through the center of a further embodiment of an air diffuser.

In FIG. 3, 11 is an upper zone of a hollow tube like structure with an air admitting opening therein, 12 is an air admitting opening, 13 is an insect excluding screen within the air admitting opening 12, 14 is a side wall, 15 is a sealant which seals the screen 12 to the side wall 14, 16 is a substantially rigid grill, 17 is a sealant which seals the grill 16 to the side wall 14, 18 is a corrugation section having an aperture therein, and 19 is an aperture located in the outermost surface of the corrugation section. The corrugations in this embodiment extend about the surface of the hollow tube like structure in a direction which is perpendicular to the lengthwise dimension of the hollow tube like structure, the air diffuser.

Figure 4:
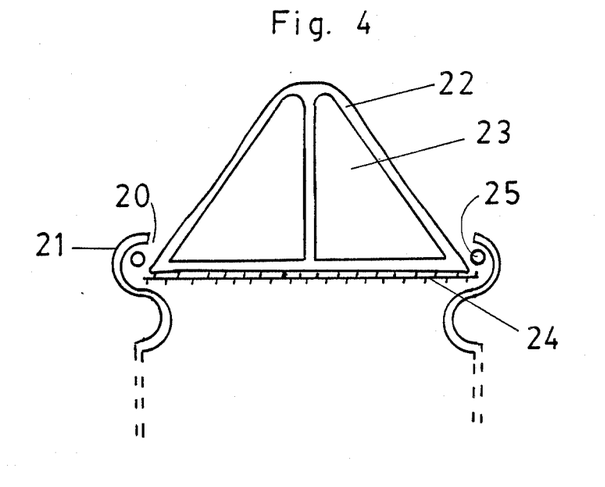
FIG. 4 is a front view in section, of the zone including an air admitting opening, of a lengthwise plane through the center of a further embodiment of an air diffuser.

In FIG. 4, 20 is an air admitting opening, 21 is a side wall in an upper zone of a hollow tube like structure with the air admitting opening 20 within the upper zone, 22 is a unitary structure having air admitting sections which enable air exteriorly of the hollow tube like structure to be in communication with air interiorly of the hollow tube like structure and substantially shields the interior of the upper zone of the hollow tube like structure from items larger than two inches in their smallest dimension which otherwise might enter the opening 20 and thereby could damage an insect excluding screen within the upperzone of the hollow tube like structure, 23 is an air admitting section of the shielding structure 22 with a dimension less than two inches in its smallest dimension, 24 is an insect excluding screen, 25 is a sealant which seals both the screen 24 and the unitary structure 22 to the side wall 21. In this embodiment the unitary curved cover structure 22 being rigid in the direction responding to a stress directed lengthwise towards the air admitting opening 20 from external to the hollow tube like structure and being placed above the member suitable for excluding flying insects 24.

In FIG. 5, 21, 22 and 23 have the same meaning as noted in FIG. 4.

Figure 5:
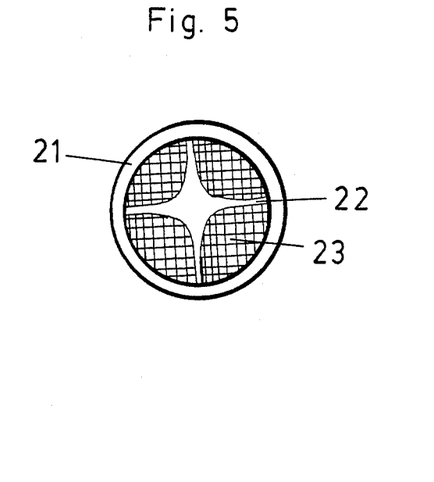
FIG. 5 is a top view of the same embodiment of an air diffuser as in FIG. 4.

In the embodiment of FIG. 4 and FIG. 5 the sealant 25 is a thermoplastic material which may be applied hot and thereby made to flow into close contact with the insect excluding screen 24, the unitary structure 22 and also into contact with the nearby side walls and further upon cooling becomes substantially non flowing and forms an adhesive bond holding these three members together. Asphalt may be used as well as hot melt sealants formed for this purpose with blends including thermoplastic substances. Low molecular weight polymers, including rubbers and including polyolefins, may be used to formulate the sealants.

One or both sealants, sealing the insect excluding screen and the supporting structure which prevents damage to or displacement of the screen, may be a mechanical device or may be a rubber grommet like structure formed to fit over the edge portions of one or both of the screen and the edge portions of the supporting structure which are closest to contacting the side walls of the corrugated hollow tube like structure. A suitable mechanical device includes a deformable clip, shaped to fit securely within the side walls of a corrugation section of the pipe, which is of a size which holds the screen and the associated supporting structure securely in place and forms an insect excluding fit. Such a clip may be fastened to the uppermost edges of the pipe, particularly with pipe having corrugations extending in the direction parallel to the lengthwise dimension of the pipe. With pipe having corrugations in the direction perpendicular to the lengthwise dimension, it is preferred for the clip to fit securely within a corrugation section and to assist it by means of adhesive applied on installation.

An air diffuser according to the present invention should be of a size which fits within the container, or mass of compost, in which it will function and also be of a size and mass which can be manually handled.

Composting according to the instant invention involves employing, in combination, a container and a device of matching size to facilitate the ingress of air into and the corresponding release of gases from the composting wastes. A variety of containers suitable for containing compost, and forming compost from organic wastes, may be employed. These include containers described as one of the following: a flexible walled structure with air permeable walls; a flexible walled structure with walls substantially impermeable to air; a bag having flexible and air permeable walls; a bag having flexible walls substantially impermeable to air; a rigid walled container having a cover constructed at least partially of flexible weather resistant polymeric material; a conventional domestic trash container with a cover made at least partly of flexible weather resistant polymeric material; a conventional shipping drum with a cover made at least partly of flexible weather resistant polymeric material; or a combination of at least two of these.

In such containers there must be a cover, as part of the container, or another upper wall portion of the container which has at least one access opening providing access to the interior of the container. This upper wall portion may be of the form of one of the following: extending continuously from the side walls; substantially of the same construction as the side walls; a cover which is attachable to and detachable from the walls of the container; a cover attachable to and detachable from the hollow tube like structure; a cover which is attachable to and detachable from the walls of the container and also is attachable to and detachable from the hollow tube like structure; a flexible material, such as a rubberized sheet or a plastic sheet of polyethylene less than one tenth inch thick or a sheet of polyvinyl chloride less than one tenth inch thick; a cover which comprises at least two portions one of which includes an openable and closeable access opening; a cover comprising at least two portions one of which includes an opening of a form to releasably receive the hollow tube like structure and another portion includes a means to access the interior of the container. Such means may simply be a separate access member; a shute, or a door, or a moveable closure.

Suitable containers may include one of; a trash can, a surplus shipping drum and a plastic bag, such as the polyethylene bags used for waste collection and garbage disposal. Preferably a plastic bag should be of thickness between one thousandth of an inch and ten hundredths of an inch. A preferred bag is thirty inches in width by fourty eight inches in length, measured flat, made of black polyethylene of four hundreths of an inch thickness.

Containers may be used which have a capacity between one cubic foot and five hundred cubic feet and preferably between two cubic feet and forty cubic feet. With such containers the length of the air diffuser, the hollow tube like structure, may be between one foot and eight feet and preferably between one and one half feet and three feet. The internal width of the hollow tube like structure may be between three inches and twelve inches and preferably between four inches and six inches.

A bag of 30 inches by 48 inches requires a hollow tube like structure, to facilitate air contact with the composting wastes, which is at least twenty two inches in length and preferably at least four inches in internal diameter or width. By comparison, another preferred bag, of 60 inches by 72 inches, of six hundredths of an inch thick black polyethylene, requires a hollow tube like structure as an air diffuser which is at least thirty inches in length and such a a hollow tube like structure may functionally be about six inches in diameter or width. Larger diameter hollow tube like structures may be employed with containers of larger capacity.

The bags may be closed about or attached to, and detached from, the hollow tube like structure by means of tie cords, or straps, or slidding locking belts, or clips, which fasten to the bag only or fasten to the hollow tube like structure of fasten to both or combinations of these. One preferred way to attach the opening of the bag about the upper zone of the hollow tube like structure includes the bag being closeable and attachable to the uppermost zone by means of at least one cord which slides reversibly within guide members in the walls of the bag and being located so as to enable the access opening to be closed. Another preferred manner of attaching the opening of the bag about the upper zone of the hollow tube like structure includes the bag being closeable and attachable to the uppermost zone by means of two cords each secured to the bag and each being ale to close at least part of the bag opening and both being supported so they may slide reversibly within guide members in the walls of the bag and being located so as to enable the access opening to be closed. A further preferred means of attaching the opening of the bag about the upper zone of the hollow tube like structure includes the bag being closeable and attachable to the uppermost zone by means of at least one tie strap secured to the upper wall of the bag and with a strap receiving fastener unit also secured on the upper wall of the bag whereby the strap may be wrapped about the upper walls of the bag thereby closing the bag about and to the hollow tube like structure and the strap then being fastened to the said strap receiving fastener unit.

The hollow tube like structure, an air diffuser, may consist substantially of one of the following; an extruded thermoplastic polymeric material, a metal, a biodegradable material, a composite material, and may include a combination of at least two of these.

The side walls of the hollow tube like structure must be at least partially constructed of corrugated tubing or pipe and apertures in the side walls may be, at least partially, formed by the outer surfaces of the corrugations being perforated, or the inner surfaces of the corrugations perforated, and including corrugations in both inner and outer surfaces.

Perforations in the side walls of the hollow tube like structure, the air diffuser, may reduce the rigidity of the side walls and it is sometimes desirable to have a zone adjacent to at least one lengthwise end to be without perforations or to have any perforations therein covered. If only one end is without apertures it is the end having therein the opening to admit air and having an insect excluding member therein. The size of the zone without apertures should be large enough to permit ready attachment of the upper wall section of the container to the air diffuser and this corresponds to a zone with a lengthwise distance corresponding to the width of at least one of the side wall corrugations.

The corrugations may extend lengthwise on the side walls of the corrugated tubing or corrugated pipe, or may be helically formed in a lengthwise form or may be formed as adjacent corrugations perpendicular to the lengthwise direction. One preferred embodiment includes corrugations on both surfaces being formed perpendicular to the lengthwise direction with perforations being only in the outermost surface.

The pattern of the perforations in the side walls directly relates to the rigidity of the side walls. It is preferred for the plurality of aperatures located in the side walls to be located in a form consisting of one or more of the following; the perforations on any corrugation section being substantialy evenly spaced one from another; the perforations being spaced so that the distance between the closest parts of any two perforations on a section of a corrugation is substantially the same as the average dimension of the two perforations; the perforations being formed in a linear pattern lengthwise in the side walls of the hollow tube like structure; the perforations being formed in a spiral pattern lengthwise in the side walls of the hollow tube like structure; and a plurality of perforations being formed on any corrugation section. It is preferred for the perforations to be evenly spaced, in the outer surface of corrugations of the hollow tube like structure.

The aperatures in the side walls of the hollow tube like structure, when not covered with compost excluding material, may have an average area of between about one square inch and one eighth square inch and preferably between about three quarters of a square inch and one quarter square inch. The number of perforations may be related to the fraction of the wall area occupied by the void area of the openings. It is preferred for this area, of all the perforations, to be between one half and one tenth the area of the outer surface of the tubing or pipe.

The corrugations of the the said hollow tube like structure may be of a size which, measured as a ratio of the difference between the average external width dimension and the average internal width dimension over the average internal width dimension, is between one fiftieth and one quarter and preferably between one twentieth and one eighth.

The air admitting opening of the air diffuser must have installed therein a member suitable for excluding flying insects larger than one tenth inch in their smallest dimension. The preferred member is a metallic woven screen with about eleven wires per inch by about eighteen wires per inch. The insect excluding member, which also must exclude waste from entering the air diffuser while permitting air to enter the air diffuser, may be constructed of other materials, including one or more of; porous sheet like material, mesh material, fibrous material, woven material, non woven material, perforated material. It is necessary to support these materials to prevent displacement or damage from wastes contacting the insect excluding member.

The support of or protection of the insect excluding member so as to resist displacement may include one or more of the following; (a) an assembly of elements in which at least some elements are of a dimension greater than two hundredths of an inch and with the distance between adjacent elements in the plane perpendicular to the lengthwise dimension of the hollow tube like structure being between one sixth inch and two inches and the assembly being placed immediately below and adjoining to the member suitable for excluding flying insects, (b) a unitary curved cover structure being rigid in the direction responding to a stress directed lengthwise towards the air admitting opening from external to the hollow tube like structure and being placed above the member suitable for excluding flying insects, (c) a rigid grill having at least some elements having one dimension greater than two hundredths of an inch and with the distance between adjacent elements in the plane perpendicular to the lengthwise dimension of the hollow tube like structure being between one sixth inch and two inches and the grill being placed immediately below and adjoining to the member suitable for excluding flying insects, (d) an assembly of elements in which at least some elements are of a dimension greater than two hundredths of an inch and with the distance between adjacent elements in the plane perpendicular to the lengthwise dimension of the hollow tube like structure being between one sixth inch and two inches and being placed immediately below and adjoining to the member suitable for excluding flying insects, (e) an assembly of elements forming a protective cover having air admitting regions greater than about one tenth inch in their smallest dimension and less than two inches in their largest dimension extending above the member suitable for excluding flying insects, (f) a rigid structure with air admitting regions in the plane perpendicular to the lengthwise dimension of the hollow tube like structure being greater than about one tenth inch in their smallest dimension and less than two inches in their largest dimension extending above the member suitable for excluding flying insects, (g) a rigid structure with air admitting regions having dimensions in the plane perpendicular to the lengthwise dimension of the hollow tube like structure greater than about one tenth inch in their smallest dimension and less than two inches in their largest dimension adjoining to the lower surface of the member suitable for excluding flying insects.

A preferred method of producing compost from organic waste materials involves employing the apparatus of the instant invention and the steps of; (a) installing the hollow tube like structure, the air diffuser, within the selected container whereby the air admitting opening of the said hollow tube like structure being located exteriorly of an upper wall of the container or of an upper wall of an attached cover of the container, (b) attaching at least part of a container wall, wherein the container wall may be a portion of a cover mounted on the container, to the said hollow tube like structure as required to enclose the contents of the container, (c) deattaching and attaching at least part of a container wall, wherein the part of the container wall may include an openable and closeable door therein, as required to respectively access and enclose the contents of the container, (d) accumulating organic waste matter laterally about, and adjoining to, the said hollow tube like structure, (e) adding water as required to maintain the organic matter in a moist state, (f) adding matter rich in microorganisms, (g) repeating the steps (c), (d), (e) and (f) until the container is filled to a height at least equal to half the height of the said hollow tube like structure, (h) allowing the container and at least some of the contents to remain at an average daily ambient temperature above sixty degrees Farenheit for at least fifteen days, and (i) removing the contents of the container, wherein the matter rich is microorganisms is one, or more, of one of the following; (a) natural soil, (b) compost, and (c) partially formed compost, and wherein the averae ratio, on a weight basis, of dry compostable organic matter to dry matter rich in microorganisms which is placed in the container is between 200:1 and 5:1 respectively.

One preferred method of processing waste material involves the use of a flexible walled bag, particularly for intermittent use or for seasonal use, such as the infrequent processing of leaves. It is desirable to ensure that there is at least one small liquid drain hole in the lowermost wall of any container employed for composting.

In one preferred method of processing waste material, the air diffuser is removed from the compost containable container at the end of substantially complete composting, the container being closed and the compost being stored in the container until the compost being required. The removed air diffuser may be installed in a second container and the processing of additional organic waster continued in the second container.

What I claim is:

1. A composting apparatus comprising, in combination; (a) a compost containable container, and (b) a hollow tube-like structure with improvements in said hollow tube like structure including apertured corrugated side walls and including improved means enabling air admission while excluding wastes and pests from the hollow tube-like structure, said compost containable container having an access opening in an upper wall portion thereof providing access to the interior of the container, and the hollow tube-like structure being releasably installed in said access opening so as to be attachable to and detachable from the upper wall portion of the said container and on being attached to the said container substantially closing at least part of said access opening and said hollow tube-like structure including an air admitting portion, said portion having installed therein at least one member suitable for excluding flying insects and including, beyond that necessary to exclude flying insects larger than one tenth inch in their smallest dimension, means enabling the said member to resist displacement from the air admitting portion, said hollow tube-like structure being installed in the container, said air admitting portion being in communication with the atmosphere exteriorly of said hollow tube-like structure and exteriorly of said container and with the atmosphere interiorly of said hollow tube-like structure, and said hollow tube-like structure also including an air conveying portion, and whereupon the hollow tube-like structure being installed in the access opening of the container, that portion extending into the said container having apertured side walls permitting air in the interior of the hollow tube-like structure to be in communication with air exteriorly of the said hollow tube like structure.

2. An apparatus as claimed in claim 1 in which the said upper wall portion of the said container is a member selected from the group consisting of; (a) a member extending continuously from the side walls, (b) a member substantially of the same construction as the side walls, (c) a cover member attachable to and detachable from the walls of the container, (d) a cover member attachable to and detachable from the said hollow tube like structure, (e) a cover member being attachable to and detachable from the walls of the container and also being attachable to and detachable from the said hollow tube like structure, (f) a flexible material, (g) a cover member comprising at least two portions one of which includes a openable and closeable access opening, (h) a cover member comprising at least two portions one of which includes an opening of a form to releasably receive the said hollow tube like structure and another portion includes a means to access the interior of the said container, and (i) a combination of at least two of: (a), (b), (c), (d), (e), (f), (g) and (h), and in which the said hollow tube like structure comprises side walls constructed at least partially of a member selected from the group consisting of: (a) corrugated hollow tube with the outer surfaces of the corrugations being perforated, (b) corrugated hollow tube with the inner surfaces of the corrugations being perforated, and (c) a combination of (a) and (b), and in which the said air admitting portion having installed therein a member suitable for excluding flying insects larger than one tenth inch in their smallest dimension selected from the group consisting of: (a) porous sheet like material, (b) mesh material, (c) fibrous material, (d) woven material, (e) non woven material, (f) perforated material, and (g) a combinaion of (a), (b), (c), (d), (e), and (f), and the means enabling the said member to resist displacement includes a member selected from the group consisting of: (a) rigid structure with air admitting regions in the plane perpendicular to the lengthwise dimension of the hollow tube like structure greater than about one tenth inch in their smallest dimension and less than two inches in their largest dimension extending above the said member suitable for excluding flying insects, (b) rigid structure with air admitting regions in the plane perpendicular to the lengthwise dimension of the hollow tube like structure greater than about one tenth inch in their smallest diemsnion and less than two inches in their largest dimension adjoining to the lower surface of the said member suitable for excluding flying insects, (c) rigid structure with air admitting regions in the plane perpendicular to the lengthwise dimension of the hollow tube like structure greater than about one tenth inch in their smallest dimension and less than two inches in their largest dimension supporting the lower surface of the said member suitable for excluding flying insects, and (d) a combination of at least two of (a), (b) and (c).

3. An apparatus as claimed in claim 2 in which the said compost containable container is a member selected from the group consisting of: (a) a flexible walled structure with air permeable walls, (b) a flexible walled structure with walls substantially impermeable to air, (c) a bag having flexible and air permeable walls, (d) a bag having flexible walls substantially impermeable to air, (e) a rigid walled container having a cover constructed at least partly of flexible weather resistant polymeric material, (f) a conventional domestic trash container with a cover made at least partly of flexible weather resistant polymeric material, (g) a conventional shipping drum with a cover made at least partly of flexible weather resistant polymeric material, (h) a combination of at least two of: (a), (b), (c), (d), (e), (f) and (g).

4. An apparatus as claimed in claim 3 in which the apertured corrugated side walls of the said hollow tube like structure comprise a plurality of aperatures located within a region of the lengthwise dimension of the side walls which excludes a zone comprising a distance corresponding to the width of at least one of the side wall corrugations and the said zone without corrugations being located adjacent to one of the two end extremities of the lengthwise portion of the said hollow tube like structure and that zone without an aperture being the side wall portion including the said air admitting portion of the said hollow tube like structure and in which a plurality of aperatures located in the side walls of the said hollow tube like structure are located in a form such that at least one of the following is true: (a) the perforations on any corrugation section being substantially evenly spaced one from another, (b) the perforations being spaced so that the distance between the closest parts of any two perforations on a section of a corrugation is substantially the same as the average dimension of the two perforations, (c) the perforations being formed in a linear pattern lengthwise in the side walls of the said hollow tube like structure, (d) the perforations being formed in a spiral pattern lengthwise in the side walls of the said hollow tube like structure, (e) a plurality of perforations being formed on any corrugation section, and (f) a combination of at least two of: (a), (b), (c), (d), and (e) are true.

5. An apparatus as claimed in claim 3 in which the said compost containable container has a capacity between one and five hundred cubic feet and preferably between two and forty cubic feet, and the length of the said hollow tube like structure is between one foot and eight feet and preferably between one and one half feet and three feet, and the internal width of the said hollow tube like structure is between three inches and twelve inches and preferably between four inches and six inches, and the side walls of the said hollow tube like structure being at least partially constructed of a material selected from the group consisting of: (a) an extruded thermoplastic polymeric material, (b) metal, (c) biodegradable material, (d) composite material, and (e) a combination of at least two of; (a), (b), (c) and (d), and the corrugations of the the said hollow tube like structure have a configuration selected from the group consisting of: (a) corrugations extending perpendicular to the lengthwise direction of the said hollow tube like structure, (b) corrugations extending parallel to the lengthwise direction of the said hollow tube like structure, (c) corrugations extending helically in the lengthwise direction of the said hollow tube like structure, and the the corrugations of the the said hollow tube like structure being of a size which, measured as a ratio of the difference between the average external width dimension and the average internal width dimension over the average internal width dimension, is between one fifieth and one quarter and preferably between one twentieth and one eighth, and the means enabling the said member suitable for excluding flying insects larger than one tenth inch in their smallest dimension to resist displacement includes a rigid structure being a member selected from the group consisting of: (a) an assembly of elements at least some elements being of larger dimension in the direction responding to a stress directed lengthwise towards the said air admitting opening from external to the said hollow tube like structure than in one other direction and being placed below the member suitable for excluding flying insects, (b) a unitary curved cover structure being rigid in the direction responding to a stress directed lengthwise towards the said air admitting opening from external to the said hollow tube like structure and being placed above the member suitable for excluding flying insects, (c) a rigid grill having at least some elements having one dimension greater than two hundredths of an inch and with the distance between adjacent elements in the plane perpendicular to the lengthwise dimension of the hollow tube like structure being between one sixth inch and two inches and being placed immediately below and adjoining to the member suitable for excluding flying insects, and (d) a combination of at least two of: (a), (b) and (c).

6. An apparatus as claimed in claim 4 in which the said compost containable container has a capacity between one and five hundred cubic feet and preferably between two and forty cubic feet, and the length of the said hollow tube like structure is between one foot and eight feet and preferably between one and one half feet and three feet, and the internal width of the said hollow tube like structure is between three inches and twelve inches and preferably between four inches and six inches, and the side walls of the said hollow tube like structure being at least partially constructed of a material selected from the group consisting of: (a) an extruded thermoplastic polymeric material, (b) metal, (c) biodegradable material, (d) composite material, and (e) a combination of at least two of: (a), (b), (c) and (d), and the corrugations of the the said hollow tube like structure have a configuration selected from the group consisting of: (a) corrugations extending perpendicular to the lengthwise direction of the said hollow tube like structure, (b) corrugations extending parallel to the lengthwise direction of the said hollow tube like structure, (c) corrugations extending helically in the lengthwise direction of the said hollow tube like structure, and the the corrugations of the the said hollow tube like structure being of a size which, measured as a ratio of the difference between the average external width dimension and the average internal width dimension over the average internal width dimension, is between one fiftieth and one quarter and preferably between one twentieth and one eighth, and the means enabling the said member suitable for excluding flying insects larger than one tenth inch in their smallest dimension to resist displacement includes a rigid structure being a member selected from the group consisting of: (a) an assembly of elements at least some elements being of larger dimension in the direction responding to a stress directed lengthwise towards the said air admitting opening from external to the said hollow tube like structure than in one other direction and being placed below the member suitable for excluding flying insects, (b) a unitary curved cover structure being rigid in the direction responding to a stress directed lengthwise towards the said air admitting opening from external to the said hollow tube like structure and being placed above the member suitable for excluding flying insects, (c) a rigid grill having at least some elements having one dimension greater than two hundredths of an inch and with the distance between adjacent elements in the plane perpendicular to the lengthwise dimension of the hollow tube like structure being between one sixth inch and two inches and being placed immediately below and adjoining to the member suitable for excluding flying insects, and (d) a combination of at least two of: (a), (b) and (c).

7. An apparatus as claimed in claim 4 in which the said compost containable container is a flexible plastic bag constructed of black polyethylene of four hundredths of an inch average thickness with flat dimensions of thirty inches width and fourty eight inches length and the bag being closeable and attachable to the uppermost corrugations of the said hollow tube like structure located therein by means of at least one cord which slides reversibly within guide members located so as to enable the said access opening to be closed and the said hollow tube like structure being a corrugated pipe, with the corrugations being adjacent one to another and extending perpendicular to the lengthwise direction, and said pipe being about four inches in internal diameter and about twenty two inches in length and constructed of black polyethylene with perforations in the outermost surface of the corrugations and said perforations having an average area of about one quarter square inch and the area of the perforations comprising in total about one tenth the area of the outer surface of the pipe.

8. An apparatus as claimed in claim 6 in which the said compost containable container is a flexible plastic bag constructed of black polyethylene of four hundredths of an inch average thickness with flat dimensions of thirty inches width and fourty eight inches length and the bag being closeable and attachable to the uppermost corrugations of the said hollow tube like structure located therein by means of at least one cord whch slides reversibly within guide members located so as to enable the said access opening to be closed and the said hollow tube like structure being a corrugated pipe, with the corrugations being adjacent one to another and extending perpendicular to the lengthwise direction, and said pipe being about four inches in internal diameter and about twenty two inches in length and constructed of black polyethylene with perforations in the outermost surface of the corrugations and said perforations having an average area of about one quarter square inch and the area of the perforations comprising in total about one tenth the area of the outer surface of the pipe.

9. An apparatus as claimed in claim 5 in which the said compost containable container is a flexible plastic bag made of black polyethylene of six hundredths of an inch average thickness with flat dimensions of sixty inches width and seventy two inches length and the bag being closeable and attachable to the uppermost corrugations of the said hollow tube like structure located therein by means of two cords which separately being attached to the bag and slide reversibly within guide members located so as to enable at least part of the said access opening to be closed with either cord and the said hollow tube like structure being a corrugated pipe, with the corrugations being adjacent one to another and extending perpendicular to the lengthwise direction, and being about six inches in internal diameter and about thirty two inches in length and constructed of black polyethylene with perforations in the outermost surface of the corrugations having an average area of about one half square inch and the area of the perforations comprising in total about one fifth the area of the outer surface of the pipe.

10. An apparatus as claimed in claim 5 in which the said compost containable container is a rigid walled container having a capacity of about seven cubic feet and having a cover constructed substantially of flexible vinyl film of about one tenth of an inch average thickness and the said hollow tube like structure being about six inches in internal diameter and about thirty two inches in length and constructed of black polyethylene soil drainage pipe with perforations in the outermost surface of the corrugations having an average area of about one half square inch and the area of the perforations comprising in total about one fifth the area of the outer surface of the pipe and the said hollow tube like structure being located within the rigid walled container wherein the air admitting opening being uppermost and the cover being releasably attachable to the upper portions of the said rigid walls of the container and said cover having therein an opening near the center of the cover and about said opening there being means enabling the cover to be attachable to and detachable from the uppermost zone of the side walls of the said hollow tube like structure so as to seal the vinyl cover to the said hollow tube like structure.

* * * * *